United States Patent
Miura et al.

(10) Patent No.: US 7,716,809 B2
(45) Date of Patent: May 18, 2010

(54) METHOD FOR MAKING A DOUBLE-WALLED YOKE

(75) Inventors: Takahiro Miura, Kiryu (JP); Masayuki Yoshizawa, Kiryu (JP)

(73) Assignee: Mitsuba Corporation, Kiryu-Shi, Gunma (JP)

( * ) Notice: Subject to any disclaimer, the term of this patent is extended or adjusted under 35 U.S.C. 154(b) by 458 days.

(21) Appl. No.: 11/504,345

(22) Filed: Aug. 15, 2006

(65) Prior Publication Data

US 2007/0046121 A1  Mar. 1, 2007

(30) Foreign Application Priority Data

Aug. 29, 2005  (JP) .............................. 2005-247803

(51) Int. Cl.
*H02K 15/00* (2006.01)
(52) U.S. Cl. .......................... 29/596; 29/598; 29/421.1; 72/348
(58) Field of Classification Search ........... 29/596–598, 29/732; 72/350, 351, 349, 348; 310/154.1, 310/42, 89
See application file for complete search history.

(56) References Cited

U.S. PATENT DOCUMENTS

| | | | | |
|---|---|---|---|---|
| 5,175,460 A | * | 12/1992 | Ishizuka | 310/154.09 |
| 6,568,064 B2 | * | 5/2003 | Kanno et al. | 29/596 |
| 6,701,603 B2 | * | 3/2004 | Matsuura et al. | 29/596 |
| 6,984,905 B2 | * | 1/2006 | Sano et al. | 29/596 |

FOREIGN PATENT DOCUMENTS

| | | |
|---|---|---|
| JP | 11089123 | 3/1999 |
| JP | 2002325389 | 11/2002 |

* cited by examiner

*Primary Examiner*—Minh Trinh
(74) *Attorney, Agent, or Firm*—Marshall & Melhorn, LLC

(57) ABSTRACT

Provided is a method for making a double-walled yoke that allows an inner yoke (4) and outer yoke (3) to be integrally joined to each other both easily and securely. Such a yoke provides an adequate cross sectional area for a magnetic path of the yoke while minimizing the weight of the yoke. A tubular member (14) destined to be form the inner yoke and a cup-shaped member (13) destined to form the outer yoke are both fitted on a punch (7) and a drawing process is executed by using an appropriate drawing die (8). The outer yoke may have a small wall thickness as long as it is capable of retaining its shape during use or supporting a bearing for the motor. The inner yoke is required to be relatively small in size as long it is capable of forming a satisfactory magnetic path for the motor. A satisfactory magnetic path can be obtained if the yoke is provided with an adequate wall thickness so as to provide an adequate cross sectional area for the magnetic path.

11 Claims, 10 Drawing Sheets

Fig.2
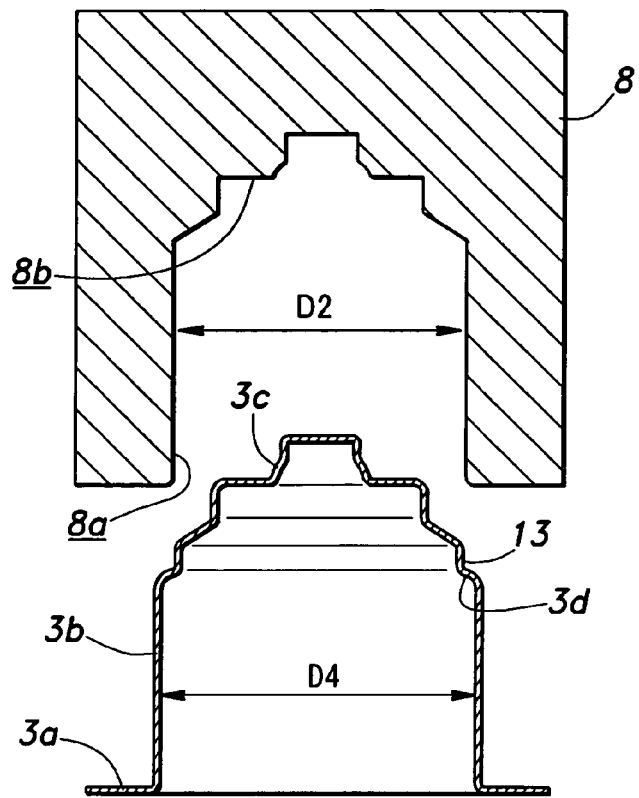
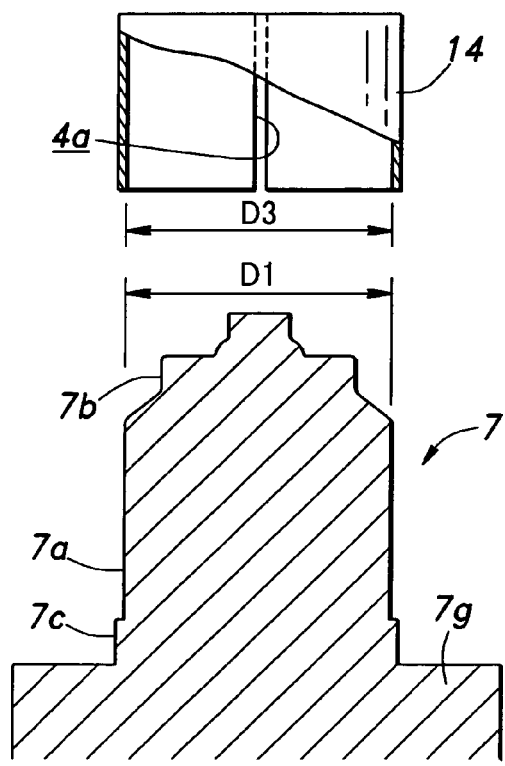

METHOD FOR MAKING A DOUBLE-WALLED YOKE

TECHNICAL FIELD

The present invention relates to a double-walled yoke including a cup-shaped outer yoke and a tubular inner yoke nested in and secured to the outer yoke in a coaxial relationship and a method of making such a double-walled yoke.

BACKGROUND OF THE INVENTION

A conventional motor casing typically comprises an end plate supporting a brush holder and a cup-shaped yoke connected to the end plate. The cup-shaped yoke is typically formed by a deep drawing process. FIG. 14 shows such an example. A radial outer flange 31a is formed at an open end of a cup-shaped yoke 31. The flange 31a is formed at the same time as forming the yoke 31 by a deep drawing process.

The circumferential wall 31b of the yoke 31 that supports permanent magnets 32 is required to have a certain thickness so that a magnetic path having an adequate cross sectional area may be achieved. Therefore, the material for forming the yoke 31 is required to consist of a plate member having a corresponding thickness. When such material is subjected to a deep drawing process, the bottom portion that defines a bearing support portion 31c is stretched, and is given with a reduced wall thickness upon completion of the deep drawing process. However, the radial flange 31a would not be stretched to such an extent during the deep drawing process, and is given with a wall thickness d similar to that of the circumferential wall upon completion of the deep drawing process. Therefore, the thickness of the radial flange 31a is greater than desired, and this adds to the weight of the yoke without providing any benefits.

However, there is an ever growing demand to reduce the weight of a motor, and it is desired to minimize the weight of a yoke without unduly complicating the manufacturing process.

Japanese patent laid-open publication 11-089123 discloses a double-walled yoke that combines a tubular inner yoke for supporting permanent magnets and a cup-shaped deep-drawn outer yoke having a relatively small thickness. Thereby, only the part of the yoke that defines the magnetic path for the permanent magnets is given with an increased thickness while the remaining part of the yoke is given with a reduced thickness. Therefore, the weight of the yoke can be minimized without compromising the magnetic performance of the yoke.

According to this previously proposed yoke, the inner yoke and outer yoke are integrally combined apparently by press fitting the inner yoke into the outer yoke. However, a press fitting process may involve seizure and/or deformation of the inner yoke unless the inner and outer yokes are prepared at a very high precision, and a considerable amount of effort and cost are required to carry out the press fitting process for a yoke of this type in a successful manner.

BRIEF SUMMARY OF THE INVENTION

In view of such problems of the prior art, a primary object of the present invention is to provide a method for making a double-walled yoke that allows an inner yoke and outer yoke to be integrally joined to each other both easily and securely.

A second object of the present invention is to provide a method of making a double-walled yoke at a high precision.

A third object of the present invention is to provide a double-walled yoke which provides an adequate cross sectional area for a magnetic path of the yoke while minimizing the weight of the yoke.

A fourth object of the present invention is to provide a double-walled yoke which joins an inner and outer yoke in a highly secure manner and can be manufactured at low cost.

According to the present invention, such objects can be accomplished by providing a method for making a double-walled yoke including a cup-shaped outer yoke and a tubular inner yoke nested in and secured to the outer yoke in a coaxial relationship, comprising: preparing a cup-shaped member destined to form the outer yoke and having a diameter greater than that of the outer yoke; preparing a tubular member destined to form the inner yoke; preparing a cylindrical punch having an outer profile for defining an inner profile of the double-walled yoke; fitting the tubular member on the punch; fitting the cup-shaped member on the punch over the tubular member; preparing a drawing die having an inner profile for defining an outer profile of the double-walled yoke; and fitting the drawing die on the cup-shaped member and drawing the outer yoke onto the tubular member so that the tubular member is fixedly secured to the inner surface of the cup-shaped member.

The outer yoke may have a small wall thickness as long as it is capable of retaining its shape during use or supporting a bearing for the motor. The inner yoke is required to be relatively small in size as long it is capable of forming a satisfactory magnetic path for the motor. A satisfactory magnetic path can be obtained if the yoke is provided with an adequate wall thickness so as to provide an adequate cross sectional area for the magnetic path.

The punch may be provided with an annular shoulder to engage a lower axial edge of the tubular member so that the tubular member may be accurately positioned in the axial direction relative to the cup-shaped member in a highly simple manner. In such a case, if the cup-shaped member is provided with an annular shoulder that abuts an upper axial edge of the tubular member when the cup-shaped member is fitted on the punch over the tubular member, the tubular member is axially compressed between the annular shoulder of the cup-shaped member and annular should surface of the punch while the outer circumferential surface of the tubular member is constricted by the drawing die during the drawing process so that the tubular member can be firmly secured to the inner circumferential surface of the cup-shaped member by the drawing process.

The annular shoulder may be defined by a tapered surface so that the lower axial edge of the tubular member may flare out and dig into the cup-shaped member and the secure attachment between the two members may be effected by the drawing process. If the lower axial edge of the tubular member is already flared outwardly before the drawing process, a similar result can be achieved without regard to if the annular shoulder surface is tapered or not.

Typically, the cup-shaped member is provided with a radial outer flange at an open end thereof, and the punch is provided with a base block defining a flat upper surface that abuts the radial outer flange of the cup-shaped member when the cup-shaped member is fitted on the punch over the tubular member. Thereby, the axial positioning of the cup-shaped member can be achieved in a highly simple manner.

To ensure a secure engagement between the tubular member and cup-shaped member against a relatively rotation in the circumferential direction, an outer circumferential surface of the punch may be provided with at least one axial ridge or an inner circumferential surface of the drawing die is provided with at least one axial ridge. Alternatively, for the same purpose, the punch and drawing die may be configured in such a manner that the tubular member and cup-shaped member are drawn so as to have a cross section that deviates from a true circle. Thereby, the relative rotation between the tubular member and cup-shaped member can be effectively prevented.

Prior to the drawing process, lubricating oil is applied to the tubular member and/or cup-shaped member so that the drawing process may be executed without any undesired seizure and/or deformation of the tubular member and/or cup-shaped member. However, the lubricating oil could be trapped between the punch and tubular member, and it could cause deformation in the shape of the tubular member. Such a problem can be avoided if the lubricating oil can be released from the gap between the punch and tubular member during the drawing process. To promote the release of the lubricating oil during a drawing process, an axial lower edge of the tubular member may be provided with at least one notch.

The tubular member may be provided with an axial slit extending over an entire axial length thereof so that the cost for preparing the tubular member may be minimized. The slit would not cause any undue increase in the magnetic resistance of the yoke if the permanent magnets are secured to the tubular member (inner yoke) so that the slit is located between the opposing edges of the adjacent permanent magnets.

According to a certain aspect of the present invention, the present invention provides a double-walled motor yoke including a cup-shaped outer yoke and a tubular inner yoke nested in and secured to the outer yoke in a coaxial relationship, characterized by that the motor yoke is formed by preparing a cup-shaped member destined to form the outer yoke and having a diameter slightly greater than that of the final outer yoke and a tubular member destined to form the inner yoke, and drawing the cup-shaped member onto the tubular member so as to form the inner yoke and outer yoke that are integrally joined to each other.

Thereby, the inner yoke and outer yoke can be joined integrally to each other without requiring any special arrangements, and are not required to be prepared at a very high precision as opposed to the conventional press fitting process.

To restrict a relative axial movement of the inner yoke toward the closed end of the outer yoke, the outer yoke may be provided with an annular shoulder in a part thereof adjacent to a closed end thereof, the annular should of the outer yoke engaging a corresponding axial end of the inner yoke. To restrict a relative axial movement of the inner yoke toward the open end of the outer yoke, an axial end of the inner yoke corresponding to an open end of the outer yoke may be configured so as to at least partly dig into an inner circumferential surface of the outer yoke.

The inner yoke and outer yoke may be engaged by each other by a projection that is formed in one of the yokes and digs into the other so as to secure the inner yoke to the outer yoke against a relative circumferential movement.

An axial end of the inner yoke corresponding to an open end of the outer yoke may be provided with at least one notch so that lubricating oil that may be present on the surface of the tubular member and/or cup-shaped member may be allowed to escape during the drawing process. If lubricating oil is trapped in a gap that may exist between different layers of the material or between the die assembly and the material, it could cause undesired deformation of the finished outer yoke.

The tubular member destined to form the inner yoke may be provided with a slit extending axial over an entire length thereof so that the tubular member may be economically prepared by rolling a strip of steel plate.

BRIEF DESCRIPTION OF THE DRAWINGS

Now the present invention is described in the following with reference to the appended drawings, in which:

FIG. 2 is an exploded sectional view showing the cup-shaped member and tubular member in relation with the drawing die and punch;

FIG. 7b is a cross sectional view taken along line VIIb-VIIb of FIG. 7a;

FIG. 9b is a cross section view of an assembly including permanent magnets, inner yoke and outer yoke that is formed by using the drawing die illustrated in FIG. 9a;

DETAILED DESCRIPTION OF THE PREFERRED EMBODIMENTS

Figure 1:
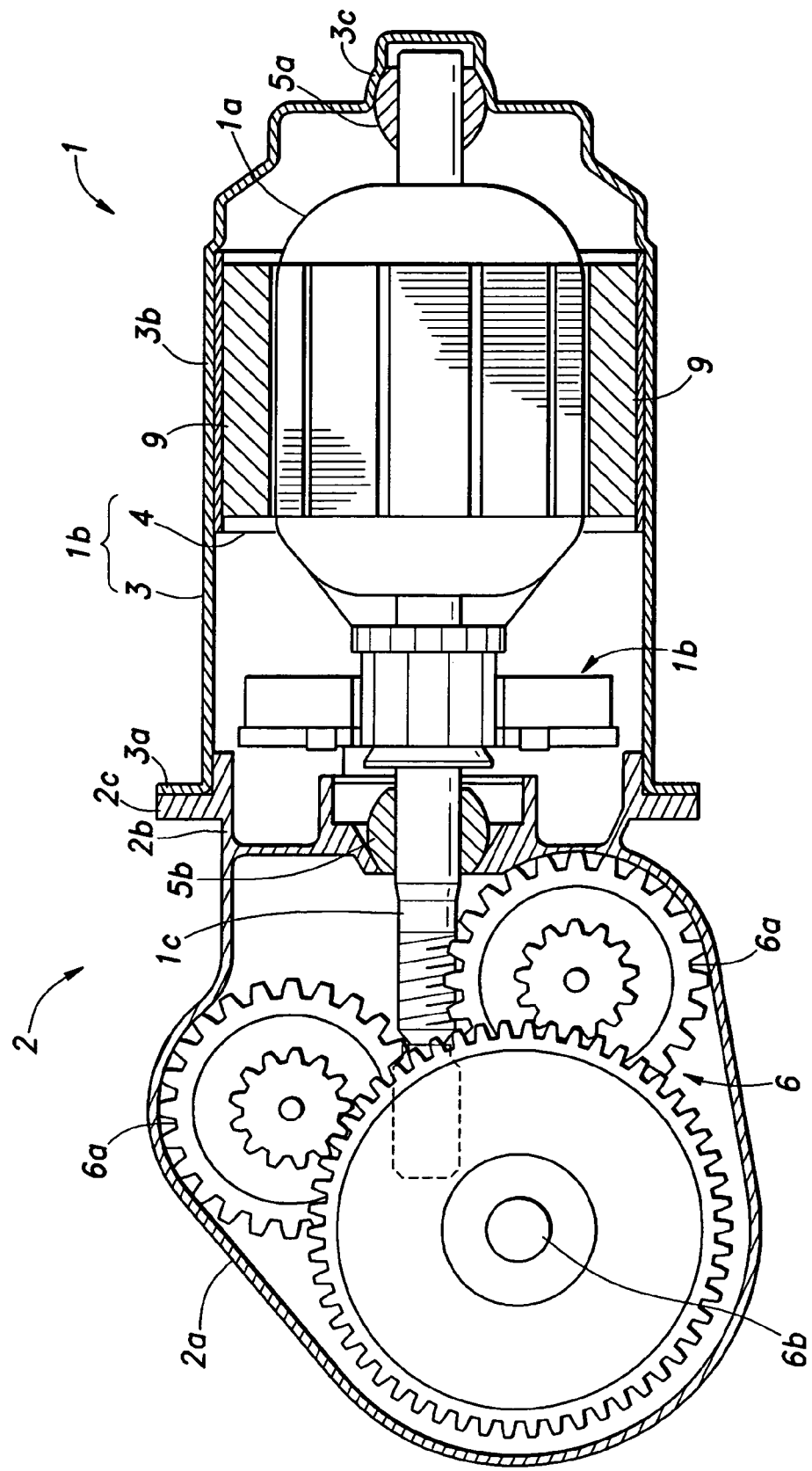
FIG. 1 is a sectional view of a motor unit embodying the present invention.

FIG. 1 is a sectional view of a motor unit embodying the present invention. The illustrated motor unit may be applied to an automotive wiper unit among other possibilities, and integrally incorporates an electric motor 1 and a reduction gear unit 2. The motor 1 comprises a rotor 1a and a casing 1b that surrounds the rotor 1a and serves as a yoke 1b. This yoke 1b is provided with a double-walled structure that includes a cylindrical cup-shaped outer yoke 3 and a tubular inner yoke 4 provided along the inner circumferential surface of the outer yoke 3. To the inner circumferential surface of the inner yoke 4 are attached a pair of arcuate permanent magnets 9 in a symmetrical arrangement.

The reduction gear unit 2 comprises a casing 2a that is provided with an open end configured to be connected to the open end of the outer yoke 3, and this casing 2a includes a cylindrical portion 2b that accommodates brushes 1b in sliding engagement with a part of the rotor 1a of the motor 1. The brushes 1b are secured to the inner surface of the cylindrical portion 2b via a mounting portion not shown in the drawing. The open end of the reduction gear unit casing 2a is provided with outwardly directed radial flange 2c, and the open end of the outer yoke 3 is also provided with a similar corresponding radial outer flange 3a. The two radial flanges 2c and 3a abut each other and joined to each other by using threaded bolts so that the outer yoke 3 and the casing 2a may be securely joined to each other.

The rotor 1a is supported by a motor shaft 1c which is rotatably supported by a first bearing 5a provided in a bottom portion of the outer yoke 3 and a second bearing 5b provided in a partition wall separating the cylindrical portion 2b of the casing 2a from the main part of the casing 2a accommodating a gear mechanism. An axial end of the motor shaft 1c adjacent to the reduction gear unit 2 is formed with a worm that projects into the chamber defined in the casing 2a and meshes with a pair of input gears 6a each consisting of a worm wheel and forming a part of the gear mechanism. The gear mechanism additionally comprises an output gear 6b having a relatively large diameter that meshes with pinions coaxially secured to the input gears 6a, and the output gear 6b is provided with an output shaft 6b extending out of the casing 2a. The outer end of the output shaft 6b is connected to a wiper arm via a link mechanism not shown in the drawing. The casing 2a is provided with an open side which is closed by a cover not shown in the drawing.

The process of forming the inner and outer yokes 3 and 4 of the illustrated motor unit is described in the following. In the following process, the inner and outer yokes 3 and 4 are formed separately, and are joined later. First of all, a cup-shaped member 13 that is to be formed into the outer yoke 3 as shown in FIG. 2 is prepared by deep drawing a circular piece of sheet metal. The cup-shaped member 13 comprises cylindrical drum portion 3b and a bottom portion that includes a bearing support portion 3c for supporting the first bearing 5a. The bottom portion of the cup-shaped member 13 is given with a progressively reduced diameter from the drum portion 3b to the bearing support portion 3c by forming a pair of reduced diameter portions and intervening tapered portions. The radial outer flange 3a is formed around the edge of the open end of the drum portion 3b of the cup-shaped member 13. The cup-shaped member 13 is similar in shape to the finished outer yoke 3 but is somewhat larger in size.

Then, a cylindrical or tubular member 14 that is to be formed into the inner yoke 4 is prepared. The tubular member 14 may consist of a seamless tubular member formed by deep drawing a circular piece of sheet metal or may be formed by rolling a strip of sheet metal. In the latter case, the tubular member 13 is provided with a slit 4a extending over an entire length thereof in an axial direction as illustrated in FIG. 2. The tubular member 14 is similar in shape to the finished inner yoke 4 but is somewhat larger in size.

The cup-shaped member 13 and tubular member 14 are placed in a nested relationship in a die assembly including a punch 7 and a drawing die 8 as illustrated in FIG. 2. The punch 7 comprises a cylindrical portion 7a that has a diameter D1 to define the inner circumference of the inner yoke 4 and a stepped free end 7b configured to form the inner surface of the bottom portion of the outer yoke 3 that includes the reduced diameter portions, intervening tapered portions and bearing support portion 3c as mentioned earlier. The drawing die 8 comprises a straight bore portion 8a that has a diameter D2 (=D1+2$t_1$+2$t_2$; where $t_1$ and $t_2$ are the wall thicknesses of the inner and outer yokes 3 and 4, respectively) to define the outer circumference of the outer yoke 3 and a stepped bottom portion 8b that defines the bottom portion of the outer yoke 3 in cooperation with the stepped free end 7b of the punch 7.

Figure 3A:
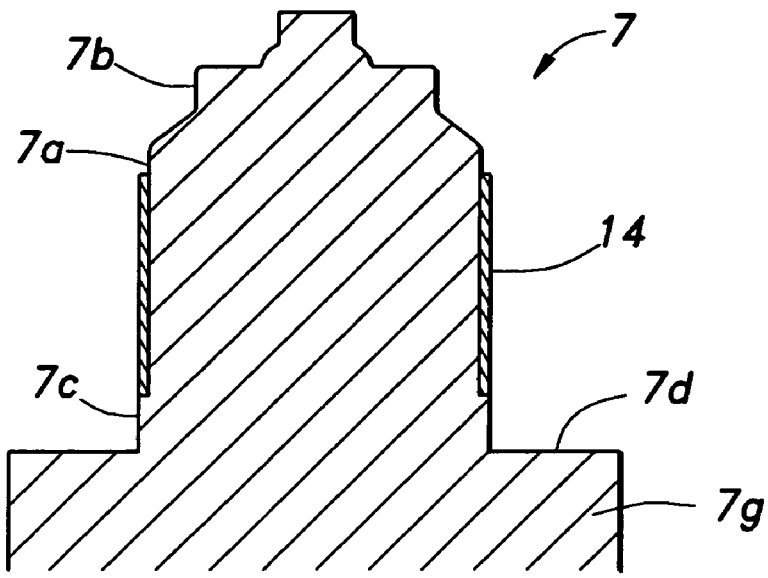
FIG. 3a is a longitudinal sectional view of the punch on which the tubular member is fitted.

The drawing process that integrally combines the inner yoke 4 with the outer yoke 3 is now described in the following. First of all, the cylindrical or tubular member 14 is fitted on the cylindrical portion 7a of the punch 7 as illustrated in FIG. 3a. The punch 7 is provided with a base block 7g having a flat upper surface 7d and an enlarged diameter portion 7c of a certain height provided between the base block 7g and the cylindrical portion 7a of the punch 7, and the enlarged diameter portion 7c has a diameter which is greater than that of the rest of the cylindrical portion 7a but smaller than the inner diameter of the drum portion 3b of the finished outer yoke 3 to define an annular shoulder surface that engages the lower edge of the cylindrical or tubular member 14. Preferably, the outer diameter of the enlarged diameter portion 7c is greater than the outer diameter of the cylindrical portion 7a by twice the wall thickness of the tubular member 14 so that the axial end of the tubular member 14 fitted on the punch 7 is securely engaged by the annular shoulder defined by the enlarged diameter portion 7c. This annular shoulder surface supports the tubular member 14 against the pressure applied by the drawing die 8 during the drawing process, and thereby determines the axial position of the tubular member 14. The upper surface 7d of the base block 7g supports the radial outer flange 3a during the drawing process, and thereby determines the axial position of the cup-shaped member 13. In other words, the annular shoulder surface of the enlarged diameter portion 7c and the upper surface 7d of the base block 7g jointly determine the relative position between the cup-shaped member 13 and tubular member 14 during the drawing process The inner diameter D3 of the tubular member 14 may be slightly greater than the outer diameter of the cylindrical portion 7a, but should be small enough so that the lower edge of the tubular member 14 may be engaged by the annular shoulder surface of the enlarged diameter portion 7c. Because it suffices if the lower edge of the tubular member 14 is engaged by the annular shoulder surface of the enlarged diameter portion 7c, the cross section of the tubular member 14 may also be slightly warped, elliptic or otherwise deviated from a true circle, and is therefore not required to be highly precise in shape or dimension. Therefore, the cost for preparing the tubular member 14 can be minimized as opposed to the prior art that requires a high precision in the dimension and shape of the cross section of the inner yoke for the required press fitting process.

Figure 3B:
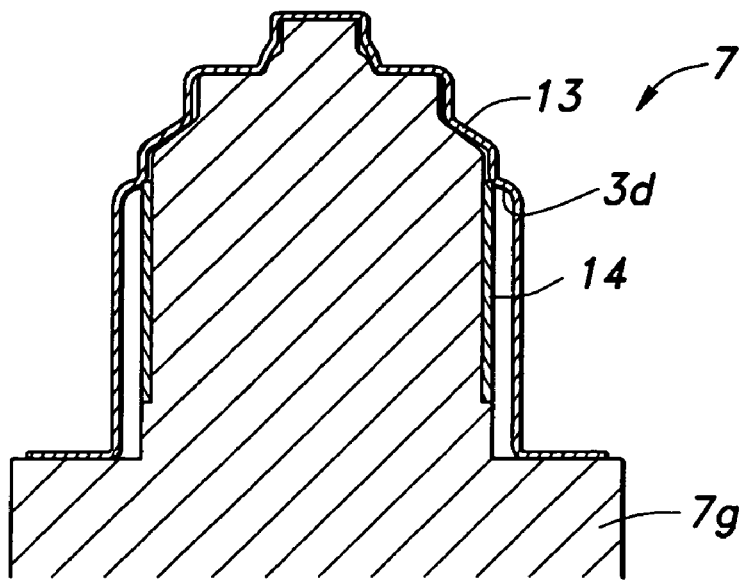
FIG. 3b is a longitudinal sectional view of the punch on which the cup-shaped member is fitted over the tubular member.

Then, as illustrated in FIG. 3b, the cup-shaped member 13 is fitted on the punch 7 over the tubular member 14. The radial outer flange 3b is placed on the upper surface 7d of the base block 7g as mentioned earlier. The inner diameter D4 of the cylindrical drum portion 3b of the cup-shaped member 13 is selected in such a manner that there is a small gap between the cylindrical portion 7a of the punch 7 and the inner surface of the cup-shaped member 13 when it is fitted on the punch 7. A similar gap may exist between the bottom portion of the cup-shaped member 13 and stepped free end 7b of the punch 7. Because the shape of the cup-shaped member 13 is not required to be highly precise, the manufacturing cost can be minimized. When a press fitting process is used, at least the drum portion 3b is required to be prepared at a fairly high precision, and this increases the manufacturing cost. On the other hand, according to the illustrated embodiment, because the final shape of the outer yoke 3 is formed by a drawing process, the cup-shaped member 13 is not required to be prepared at a high precision in the shape and dimensions.

Figure 4:
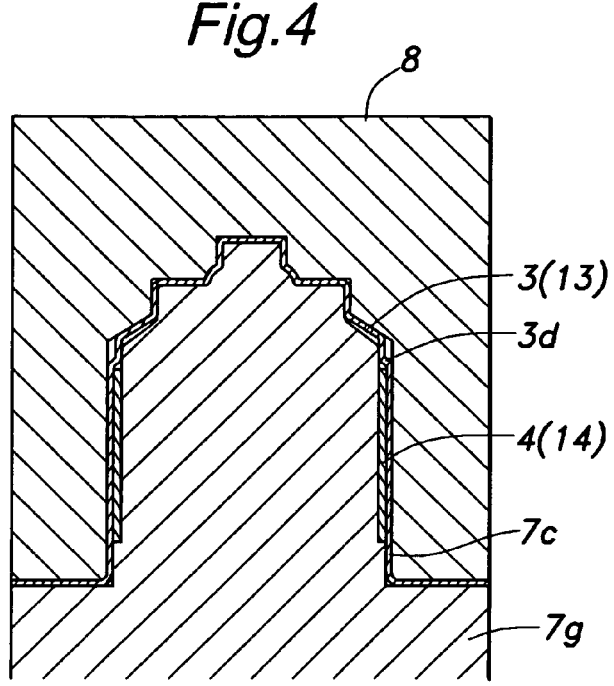
FIG. 4 is a longitudinal sectional view of the punch and drawing die during the drawing process.

The drawing process is executed by lowering the drawing die 8 relative to the punch 7 and effecting a cooperation between the drawing die 8 and punch 7 as illustrated in FIG. 4. Thereby, the cup-shaped member 13 is wrapped tightly around the tubular member 14 so that the cup-shaped member 13 is shaped into its final shape and integrally joined with the tubular member 14. The radial outer flange 3a of the cup-shaped member 13 is somewhat larger than the radial outer flange 3a of the finished outer yoke 3, and is therefore cut into the final size following the drawing process.

Thus, as a result of the drawing process, a double-walled yoke 1b joining the outer yoke 3 and inner yoke 4 in a coaxial relationship is produced. Thereby, the part of the yoke 1b that supports the permanent magnets 9 is given with an adequate wall thickness to provide a necessary magnetic path without unnecessarily increasing the wall thickness of the remaining part of the yoke 1b. In particular, in the case of a yoke provided with a radial outer flange such as that 3a of the illustrated embodiment, if the yoke is formed simply drawing a plate member having a necessary thickness, the radial outer flange 3a would be given with a thickness as large as that of the drum portion 3b. However, in the illustrated embodiment, the outer yoke 3 can be made of a relatively thin plate member, and the radial outer flange 3a does not need to be any thicker than the remaining part of the outer yoke 3. Also, the final drawing step is executed by fitting the cup-shaped member 13 and tubular member 14 formed nearly to their final forms onto the punch 7, there would be no risk of seizure or deformation of the inner yoke 4 as opposed to the conventional press fitting process.

The inner yoke 4 is provided with a longitudinal slit 4a, but it would not adversely affect the magnetic efficiency of the motor 1 particularly if the permanent magnets 9 are placed in a such a manner that the slit 4a is located in a gap between opposing side edges of the permanent magnets 9. It is also possible to prepare the tubular member 14 in such a manner that the axial slit 4a is almost invisible in the finally formed inner yoke 4.

The enlarged diameter portion 7c of the punch 7 defines the annular shoulder surface to limit the axial (thrust) movement of the inner yoke 4 during the drawing process as mentioned earlier. The drawing process firmly joins the outer yoke 3 and inner yoke 4 to each other, but there are also other means for ensuring a firm attachment between them as described hereinafter.

The cup-shaped member 13 of the illustrated embodiment is formed with a shoulder portion 3d between the bottom portion and drum portion 3b (FIG. 3b). When the cup-shaped member 13 is drawn into the final shape of the outer yoke 3, the shoulder portion 3d engages the corresponding (upper) axial edge of the tubular member 14. Therefore, during the drawing process, the tubular member 14 is axially compressed firmly between the shoulder portion 3c and annular shoulder surface of the enlarged diameter portion of the punch 7 while the outer circumference is constricted by the straight bore portion 8a of the drawing die 8 as illustrated in FIG. 4. As a result, the inner yoke 4 becomes firmly attached to the outer yoke 3 once the drawing process is completed.

The axial position of the shoulder portion 3d is determined such that it substantially coincides with the upper edge of the tubular member 14 when the tubular member 14 is supported by the annular shoulder surface of the enlarged diameter portion 7c of the punch 7 and the cup-shaped member 13 is fitted on the punch 7 over the tubular member 14 until the radial outer flange 3a abuts the flat upper surface 7d of the base block 7g.

Figure 5A:
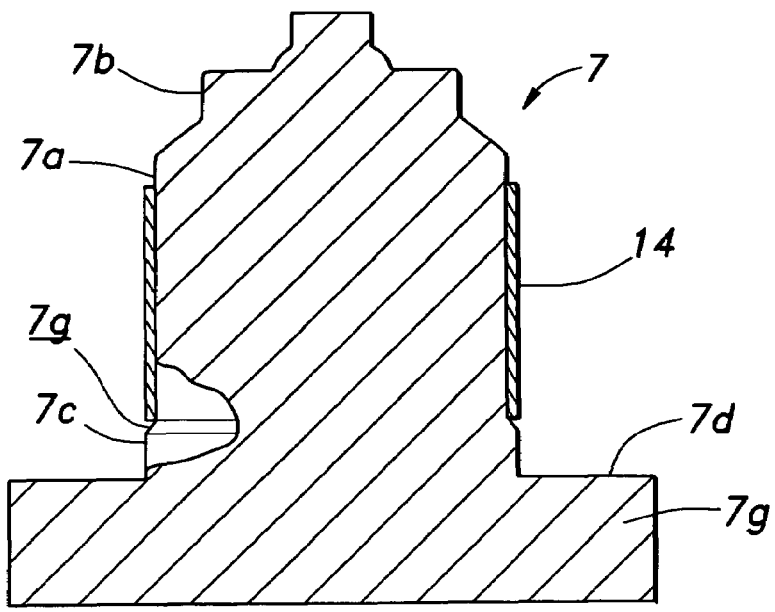
FIG. 5a is a view similar to FIG. 3a showing a punch of a modified embodiment of the present invention.
Figure 5B:
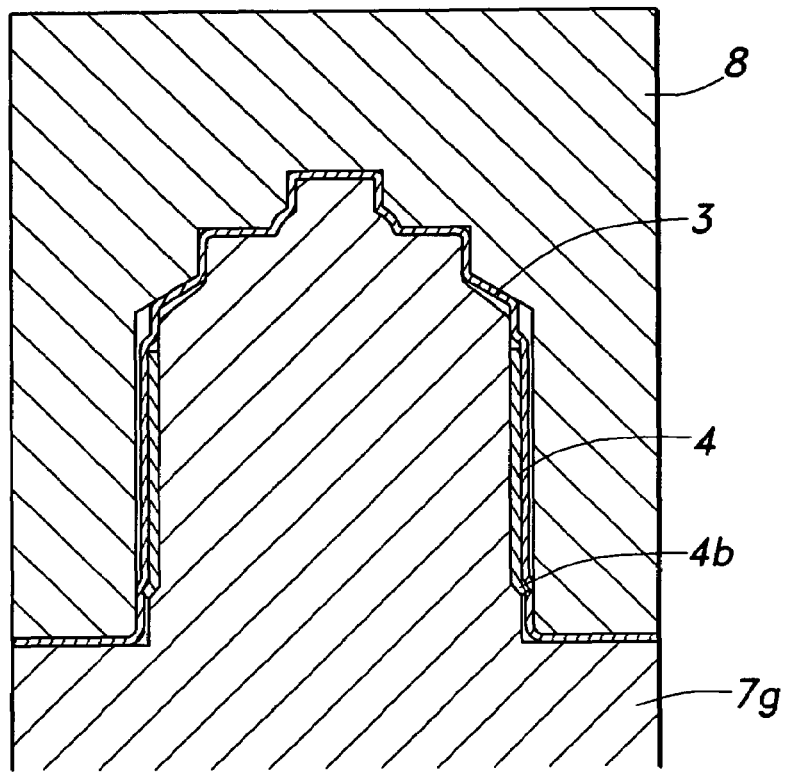
FIG. 5b is a view similar to FIG. 4 showing the punch of the modified embodiment and drawing die during the drawing process.

Optionally, the annular shoulder surface defined by the enlarged diameter portion 7c of the punch 7 may consist of a tapered surface 7e as illustrated in FIG. 5a. In this case, during the drawing process, the tapered annular shoulder surface 7e causes the corresponding axial edge of the inner yoke 4 to flare out as illustrated in FIG. 5b. The flared axial end of the inner yoke 4 at the same time digs into the outer yoke 3, and this firmly joins the inner yoke 4 with the outer yoke 3 against any relative axial movement.

Figure 6:
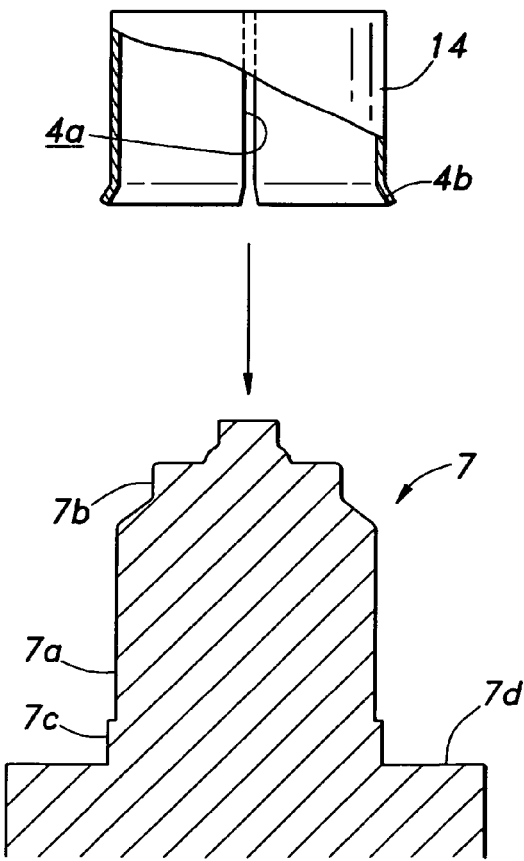
FIG. 6 is an exploded sectional view showing a tubular member of a modified embodiment in relation with the punch.

In the embodiment illustrated in FIG. 6, the corresponding lower axial edge of the tubular member 14 is formed as a flared portion 4b from the beginning. In this case, the annular shoulder surface defined by the enlarged diameter portion 7c of the punch 7 may be provided with a flat surface perpendicular to the axial line or alternatively a tapered surface as was the case in the previous embodiment. In either case, the flared portion 4b digs into the outer yoke 3 similarly to the previous embodiment, and this also firmly joins the inner yoke 4 with the outer yoke 3 against any relative axial movement.

Figure 7A:
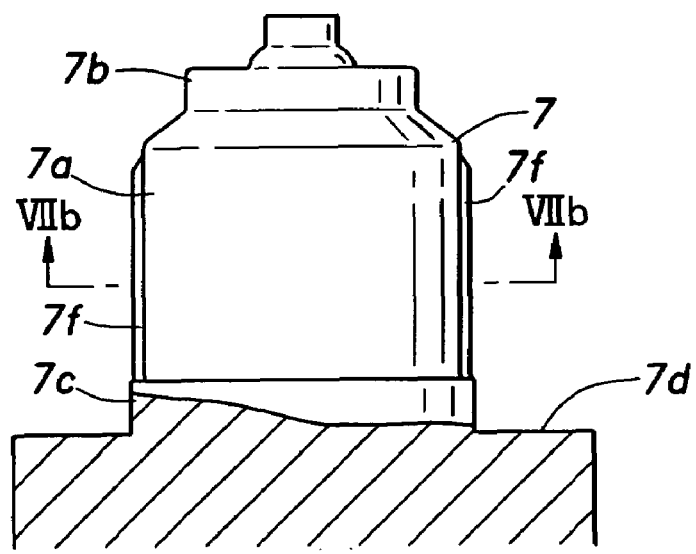
FIG. 7a is a side view or an alternate embodiment of the punch partly in section.
Figure 7B:
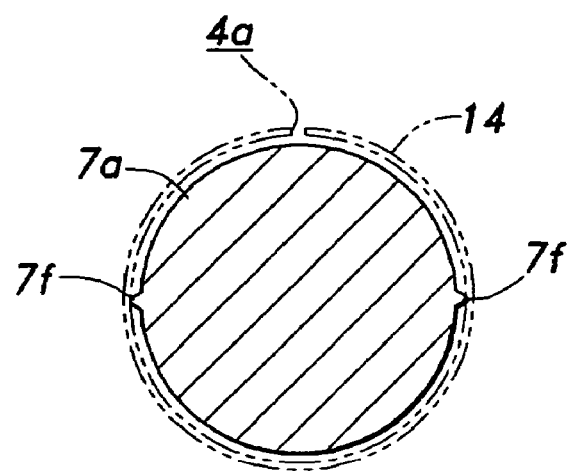

The drawing processes of the foregoing embodiments are capable of joining the inner yoke 4 with the outer yoke 3 against a relative circumferential movement as well as against a relative axial movement. However, to positively prevent any relative circumferential rotation between the inner yoke 4 and outer yoke 3, the outer circumferential surface of the cylindrical portion 7a of the punch 7 may be provided with a pair of axial ridges 7f at a diagonally opposed positions as illustrated in FIGS. 7a and 7b. The lower end of each axial ridge 7f may merge with the enlarged diameter portion 7c of the punch 7. For the ease of fitting the tubular member 4 on the punch 7, the inner diameter of the tubular member 14 may be slightly larger than the general profile of the cylindrical portion 7a including the axial ridges 7f, and the enlarged diameter portion 7c may be slightly greater than the general profile of the cylindrical portion 7a. However, owing to the presence of the axial slit 4a, even when the general profile of the cylindrical portion 7a including the axial ridges 7f is equal to or greater than the inner diameter of the tubular member 14, the tubular member 14 may be fitted on the punch 7 by spreading the tubular member 14 wider.

Figure 8:
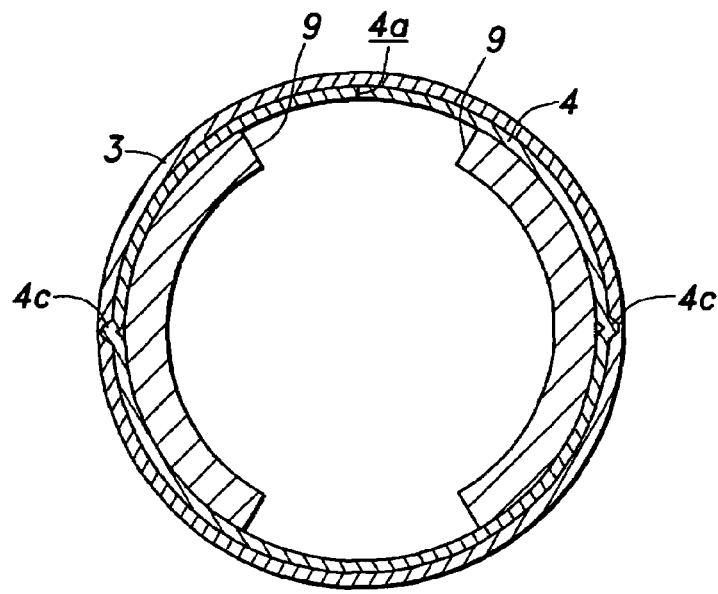
FIG. 8 is a cross section view of an assembly including permanent magnets, inner yoke and outer yoke that is formed by using the punch illustrated in FIGS. 7a and 7b.

When a drawing process is executed by using this punch 7, as shown in FIG. 8, the tubular member 14 is pushed out by the axial ridges 7f, and is formed with corresponding axial ridges 4c which in turn dig into the inner circumferential surface of the outer yoke 3 as shown in FIG. 8 so that the inner yoke 4 can be firmly secured to the outer yoke 3 against a relative rotation between them.

Figure 9A:
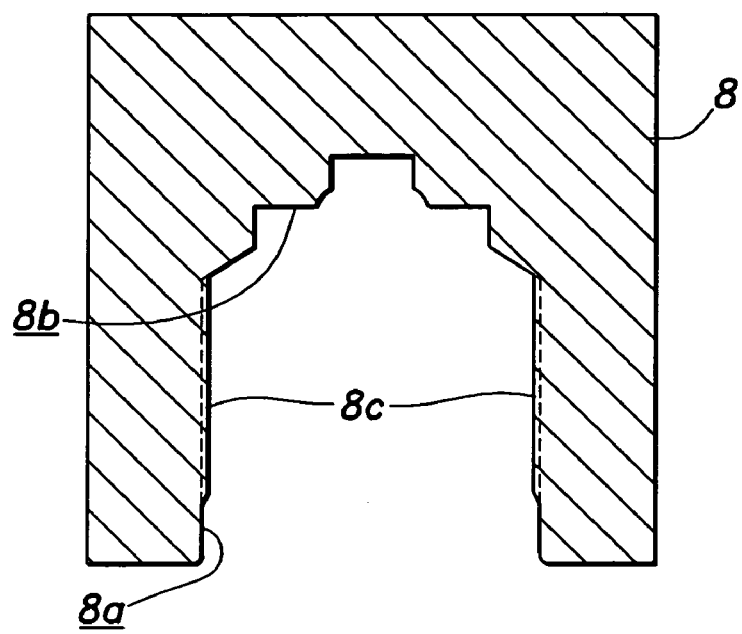
FIG. 9a is a longitudinal sectional view of a drawing die of an alternate embodiment.
Figure 9B:
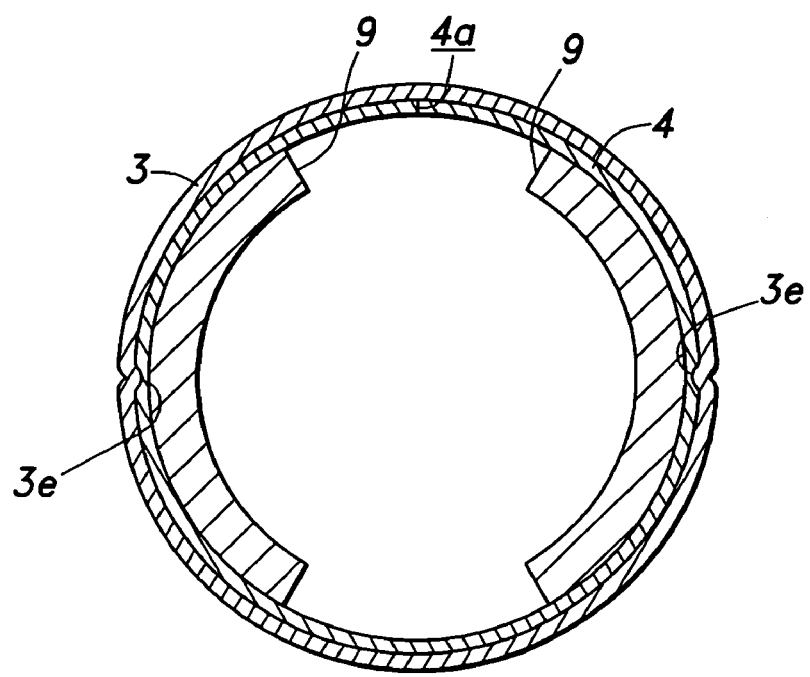

In the embodiment illustrated in FIG. 9a, axial ridges 8c are formed on the inner circumferential surface of the drawing die 8 instead on the outer circumferential surface of the punch 7. When a drawing process is executed by using this drawing die 8, the outer yoke 3 is pushed inward by the axial ridges 8c and is thereby formed with corresponding axial ridges 3e which in turn dig into the outer circumferential surface of the inner yoke 4 so that the inner yoke 4 can be firmly secured to the outer yoke 3 against a relative rotation between them.

The axial ridges formed in the punch and drawing die in the preceding embodiments can be freely modified without departing from the spirit of the present invention. Each axial ridge may have a smaller length or smaller height as required. A reduced height or reduced length means a reduced resistance during the drawing process. The number of axial ridges are not limited to two, but may be one, three or more.

Figure 10:
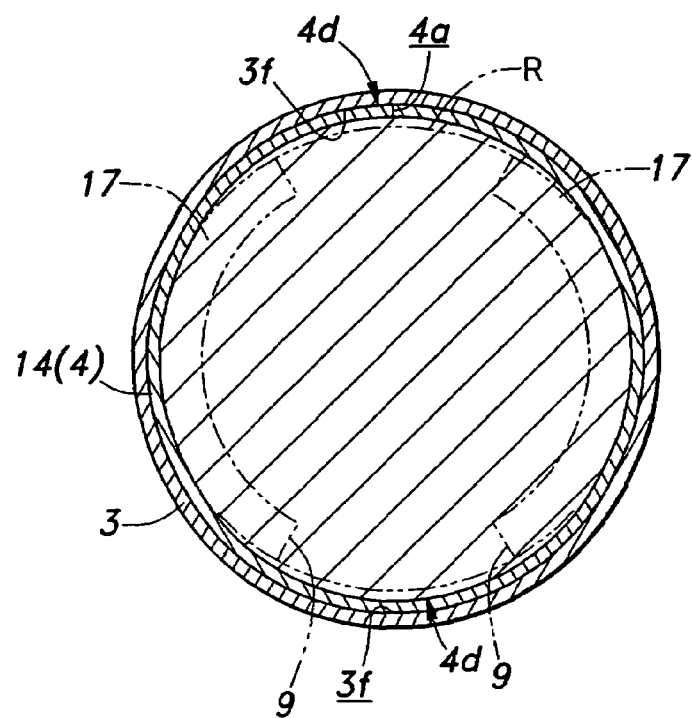
FIG. 10 is a cross sectional view of a punch of yet another embodiment of the present invention along with the tubular member and cup-shaped member.

There are other possible means for preventing the relative rotation between the inner yoke 4 and outer yoke 3. In the embodiment illustrated in FIG. 10, the cylindrical part 17*a* of the punch 17 is configured in such a manner that the part of the tubular member 14 carrying the permanent magnets 17 is truly circular (having a radius R) in shape but other part of the tubular member 14 bulges slightly outward from the true circle (having a radius R) defining the part carrying the permanent magnets 17. The corresponding straight bore portion 8*a* of the drawing die 8 is configured to conform to the profile of the punch 17 although it is not shown in the drawings. Typically, the inner profile of the straight bore portion 8*a* may be greater than the outer profile of the punch 17 by the combined thicknesses of the inner and outer yokes 4 and 3.

When a drawing process is executed by using the punch 17 and drawing die 8 described above, the inner yoke 4 is given with a pair of radially outward bulging portions 4*d* and the outer yoke 3 is given with a corresponding pair of radially outward bulging portions 3*f* by conforming to the outer profile of the punch 17, and the engagement between the mutually engaging bulging portions 4*d* and 3*f* effectively prevents a relative rotation between the inner and outer yokes 4 and 3.

Figure 11:
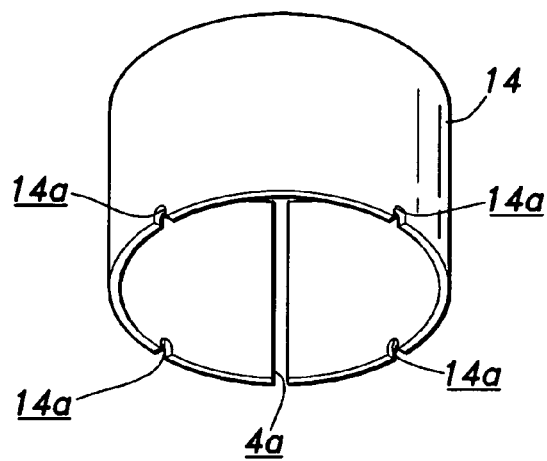
FIG. 11 is a perspective view of a tubular member of an alternate embodiment of the present invention.

Lubricating oil is present between the cylindrical portion 7*a* (17*a*) of the punch 7 (17) and the tubular member 14 during the drawing process in any of the foregoing embodiments. If such lubricating oil remains trapped in any part of the yoke 1*b* upon completion of the drawing process, it could adversely affect the final configuration of the inner circumferential surface of the inner yoke 4. According to the present invention, the lower axial edge of the tubular member 14 may be optionally provided with a plurality of notches 14*a* at a regular interval as illustrated in FIG. 11. The tubular member 14 may be formed by stamping a continuous strip of sheet metal into a plurality of short strips of sheet metal and rolling each short strip of sheet metal. Such notches 14*a* can be formed at the time of stamping the sheet metal without substantially increasing the manufacturing cost.

Figure 12:
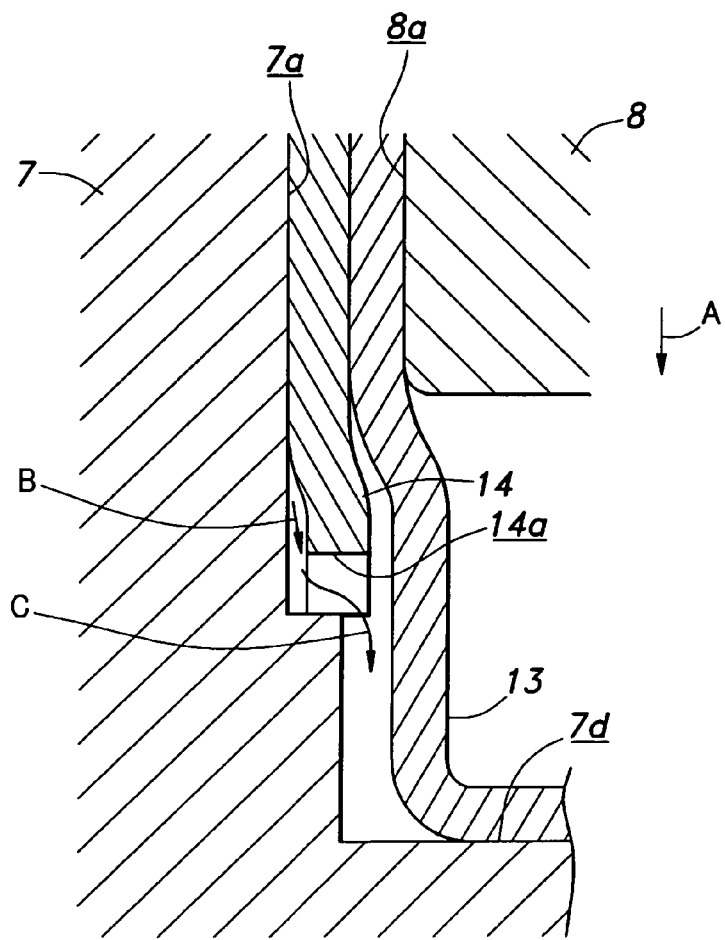
FIG. 12 is an enlarged fragmentary sectional view of the punch and drawing die illustrating the mode of operation of the tubular member shown in FIG. 11.
Figure 13:
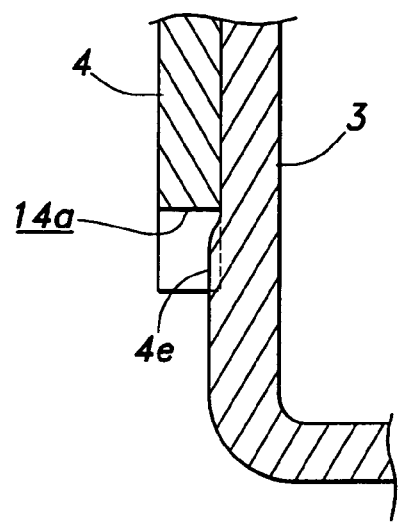
FIG. 13 is an enlarged fragmentary sectional view of a part at which the inner yoke and outer yoke are joined to each other as a result of the drawing process by using the tubular member illustrated in FIG. 11.
Figure 14:
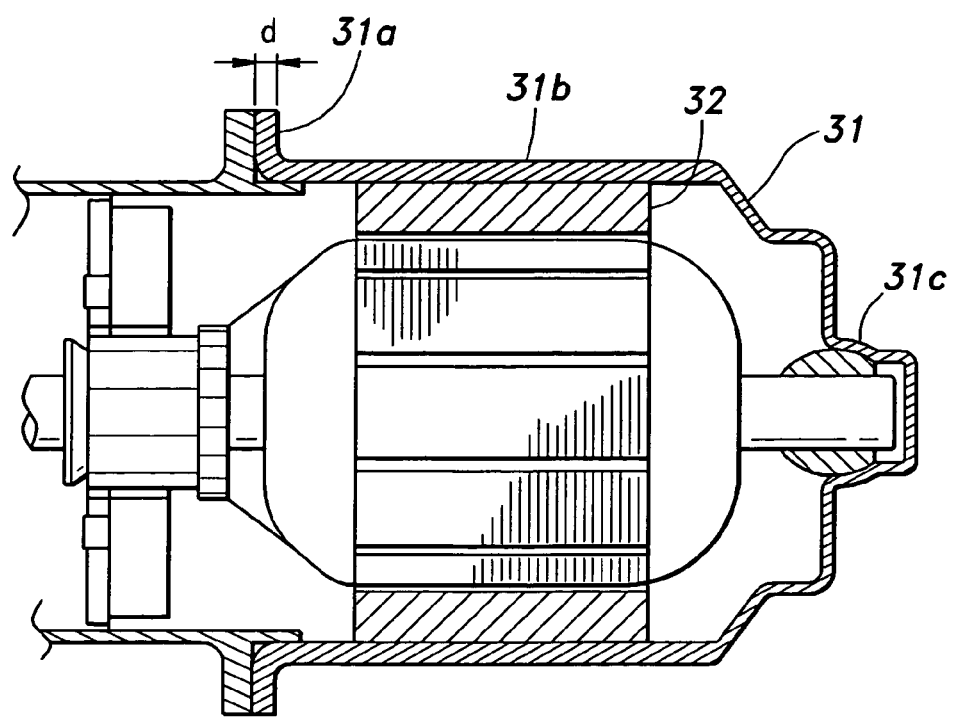
FIG. 14 is a longitudinal sectional view of a conventional motor unit.

Referring to FIG. 12, during the drawing process using such a tubular member 14, as the drawing die 8 moves downward in the direction indicated by arrow A, the cup-shaped member 13 and tubular member 14 are constricted radially inward so that the lubricating oil that may be present between the punch 7 and cylindrical member 14 is squeezed downward as indicated by arrow B. The axial lower end of the tubular member 14 may abut the annular shoulder surface of the enlarged diameter portion 7*c* of the punch 7 and may block the release of the lubricating oil if no countermeasure is taken, but in the illustrated embodiment, the lubricating oil is allowed to be released from the notches 14*a* as indicated by arrow C. Thereby, no lubricating oil is trapped between the punch 7 and the tubular member 14 so that the inner circumferential surface of the inner yoke 4 can be formed in a highly accurate manner without being affected by the presence of lubricating oil.

The illustrated tubular member 14 was provided with four of such notches 14*a*, but this number is quite arbitrary. If the tubular member 14 is provided with an axial slit 4*a*, such a slit may help the release of lubricating oil and it may be enough to form a single notch 14*a* at a diametrically opposite position to the axial slit 4*a*.

When a drawing process is executed by using a tubular member 14 that is formed with such notches 14*a*, the material of the outer yoke 3 may be squeezed into the recesses defined by the notches 14*a*. The resulting engagement between the inner yoke 4 and outer yoke 3 is effective in preventing not only the relative rotation but also the relative axial movement between the inner yoke 4 and outer yoke 3. According to such an embodiment, the manufacturing arrangement can be simplified and manufacturing cost can be minimized by eliminating the need for ridges 7*f* and 8*c* and other features to be provided to the punch 7 and drawing die 8.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A method for making a double-walled yoke including a cup-shaped outer yoke and a tubular inner yoke nested in and secured to the outer yoke in a coaxial relationship, comprising:

providing a cup-shaped member destined to form the outer yoke and having a diameter greater than that of the outer yoke;

providing a tubular member destined to form the inner yoke;

providing a cylindrical punch having an outer profile for defining an inner profile of the double-walled yoke;

fitting the tubular member on the punch;

fitting the cup-shaped member on the punch over the tubular member with a radial gap defined between the cup-shaped member and tubular member;

providing a drawing die having an inner profile for defining an outer profile of the double-walled yoke; and fitting the drawing die on the cup-shaped member and drawing the cup-shaped member onto the tubular member so that the cup-shaped member is wrapped tightly around the tubular member, and the tubular member is thereby fixedly secured to the inner surface of the cup-shaped member, and the double-walled yoke including a cup-shaped outer yoke and a tubular inner yoke nested in and secured to the outer yoke in a coaxial relationship is formed by the two members.

2. The method for making a double-walled yoke according to claim 1, wherein the punch is provided with an annular shoulder to engage a lower axial edge of the tubular member.

3. The method for making a double-walled yoke according to claim 2, wherein the annular shoulder is defined by a tapered surface.

4. The method for making a double-walled yoke according to claim 2, wherein the cup-shaped member is provided with an annular shoulder that abuts an upper axial edge of the tubular member when the cup-shaped member is fitted on the punch over the tubular member.

5. The method for making a double-walled yoke according to claim 2, wherein the lower axial edge of the tubular member is flared outwardly.

6. The method for making a double-walled yoke according to claim 1, wherein the cup-shaped member is provided with a radial outer flange at an open end thereof, and the punch is provided with a base block defining a flat upper surface that abuts the radial outer flange of the cup-shaped member when the cup-shaped member is fitted on the punch over the tubular member.

7. The method for making a double-walled yoke according to claim 1, wherein an outer circumferential surface of the punch is comprised of at least one axial ridge.

8. The method for making a double-walled yoke according to claim 1, wherein an inner circumferential surface of the drawing die is comprised of at least one axial ridge.

9. The method for making a double-walled yoke according to claim 1, wherein an axial lower edge of the tubular member is comprised of at least one notch.

10. The method for making a double-walled yoke according to claim 1, wherein the tubular member is comprised of an axial slit extending over an entire axial length thereof.

11. The method for making a double-walled yoke according to claim 1, wherein the punch and drawing die are configured in such a manner that the tubular member and cup-shaped member are drawn so as to have a cross section that deviates from a true circle.

\* \* \* \* \*